United States Patent
Cole

Patent Number: 5,927,034
Date of Patent: Jul. 27, 1999

[54] FLEXIBLE CEMENT TEXTURED BUILDING TILE AND TILE MANUFACTURING PROCESS

[76] Inventor: Larry Cole, 636 S.W. 14th Ter., Ft. Lauderdale, Fla. 33312

[21] Appl. No.: 08/718,088

[22] Filed: Sep. 17, 1996

[51] Int. Cl.⁶ ......................................................... E04C 2/00
[52] U.S. Cl. .............................. 52/391; 52/390; 428/41.8; 428/42.1; 428/47
[58] Field of Search ............................. 52/390, 391, 612, 52/796.1; 428/42.1, 41.6, 41.8, 44, 47, 142–144

[56] References Cited

U.S. PATENT DOCUMENTS

| | | | |
|---|---|---|---|
| 1,204,378 | 11/1916 | Spencer . | |
| 1,233,265 | 7/1917 | Denivelle . | |
| 1,568,070 | 1/1926 | Jennens . | |
| 1,596,482 | 8/1926 | Ewen . | |
| 1,991,373 | 2/1935 | Bradley | 428/143 |
| 2,305,126 | 12/1942 | Wohl . | |
| 2,507,020 | 5/1950 | Kullmer et al. | 428/142 X |
| 2,987,103 | 6/1961 | Yakubik | 428/47 X |
| 3,010,859 | 11/1961 | Stephens et al. | 428/47 X |
| 3,267,187 | 8/1966 | Slosberg et al. | 428/143 X |
| 3,341,396 | 9/1967 | Iverson | 428/142 |
| 3,962,504 | 6/1976 | Sherwin | 52/390 X |
| 4,349,588 | 9/1982 | Schiffer . | |
| 4,662,972 | 5/1987 | Thompson | 52/796.1 X |
| 4,745,032 | 5/1988 | Morrison | 428/215 |
| 4,852,316 | 8/1989 | Webb | 52/235 |
| 4,956,030 | 9/1990 | Baskin | 52/612 X |
| 5,320,790 | 6/1994 | Lowe | 264/31 |
| 5,441,677 | 8/1995 | Phillips | 264/31 |
| 5,502,941 | 4/1996 | Zember et al. | 52/314 |

*Primary Examiner*—Robert Canfield
*Attorney, Agent, or Firm*—Frank L. Kubler

[57] ABSTRACT

A building tile for covering a building surface includes a flexible backing layer having a rearward face for securing to the building surface and a forward face; and a flexible cement layer secured to the forward face. The tile preferably additionally includes adhesive material, where at least part of the rearward face is covered with the adhesive material for mounting the tile to the building surface. The flexible cement layer is preferably textured to be aesthetically appealing. The flexible cement layer preferably includes a mixture of a cement aggregate; an acrylic resin; a water-based paint; and a waterproof rubber material. The backing layer may be formed of laminate sheet material, peg board or formica sheet material. A process is also provided of manufacturing a building tile, including the steps of providing a flexible backing layer having a backing layer forward face and a backing layer rearward face; abrading the backing layer forward face; mixing an aggregate cement with an acrylic resin until a false set is reached; mixing into the aggregate cement and acrylic resin mixture a waterproof rubber material; and spreading the mixture over the backing layer forward face. The process preferably includes the additional steps of adding adhesive as needed to reach a mixture consistency suitable for spreading, coloring the mixture, texturing the mixture, and sealing the mixture using with a surface sealer.

9 Claims, 1 Drawing Sheet

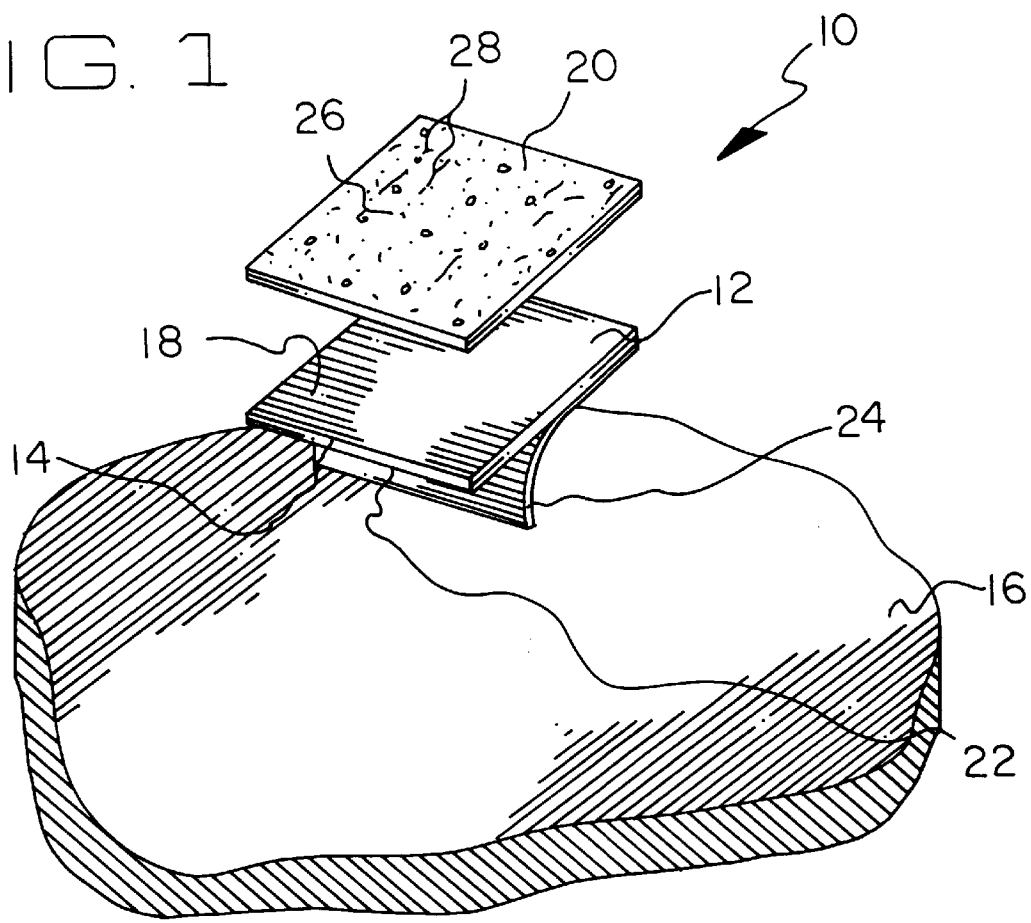
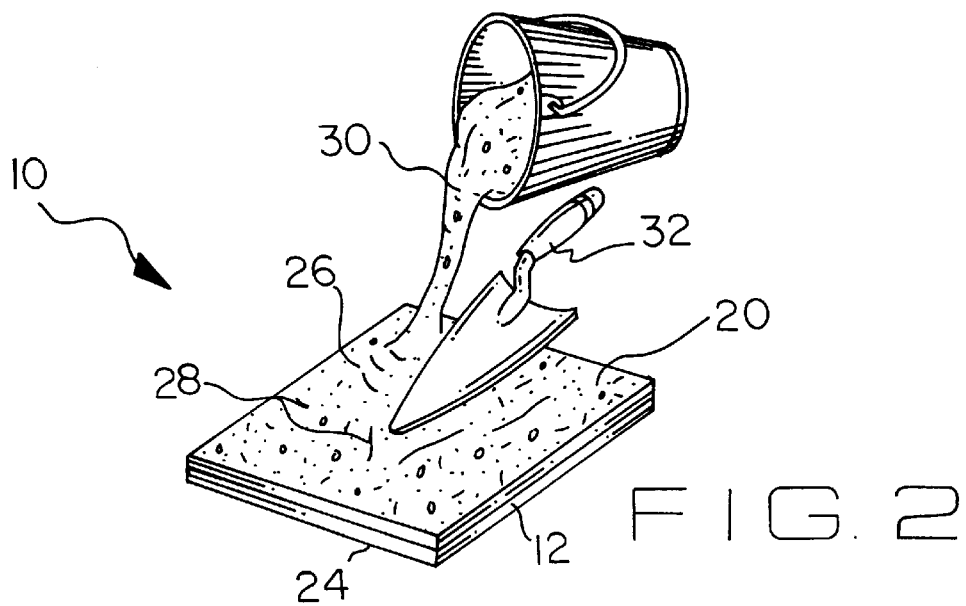

FLEXIBLE CEMENT TEXTURED BUILDING TILE AND TILE MANUFACTURING PROCESS

BACKGROUND OF THE INVENTION

1. Field of the Invention

The present invention relates generally to the field of floor and other building surface coverings. More specifically the present invention relates to a tile including a flexible and resilient backing layer having a rearward face for securing to a building surface such as a floor and a forward face covered with a flexible cement layer. The rearward face is preferably covered with a mounting adhesive and peal off paper. The flexible cement layer is preferably textured to have aesthetically appealing surface irregularities and is preferably colored and shaded with any of a wide variety of pigments. The resulting appearance, feel and durability substantially duplicate those of far more expensive poured cement surfaces.

The backing layer is preferably a square of laminate, peg board, formica, wood or other suitable sheet material. The flexible cement layer is preferably formed of a fine aggregate cement mixture combined with an acrylic resin, a water-based paint, waterproof rubber material and water-based sealer.

A process of manufacturing the tile includes the steps of sanding or grinding the forward face of the backing layer to develop grooves and to de-gloss the surface; mixing a fine aggregate cement with an acrylic resin and waiting until a false set is reached; mixing into the fine aggregate cement and acrylic resin mixture a waterproof rubber material and a water-based paint and water-based sealer; adding adhesive as needed to reach a suitable consistency; spreading the mixture over the forward face of the backing layer; coloring the mixture; texturing the mixture with a trowel or machine trowel while the mixture is wet or semi-wet, or with a machine trowel when the mixture is dry; permitting the mixture to dry completely; and then adding color as little or as much as desired; then sealing the dry mixture with a suitable sealer such as a xylene or water-based sealing coat. If the xylene-based sealer is used, one quart of boiled linseed oil may be added to a quantity of one to five gallons of xylene-based sealer to create a shiny top coat.

2. Description of the Prior Art

There have long been building surface coverings such as URO-TILE™ for creating a decorative and durable surface, which may be prepared to appear in many different styles and colors. URO-TILE™ includes an approximately one-eighth to one-quarter inch thick layer of pigmented cement mix. The mix surface is textured with a towel and randomly grooved to simulate interfitted stones or bricks. Grout is optionally troweled into the grooves to further enhance the separate stone or brick visual effect. A problem with the URO-TILE™ method is that it is very expensive and requires skilled and experienced labor on site to install, so that installation by a typical homeowner is not feasible.

The URO-TILE™ is disclosed in detail in U.S. Pat. No. 4,349,588, issued on Sep. 14, 1982 to Schiffer. Several other prior patents teach forming a cement slab with a colored surface by pouring colored mortar into a form, and then optionally pouring non-colored cement on top of the colored mortar to create a unified slab. These methods present many of the problems of Schiffer.

Spencer, U.S. Pat. No. 1,204,378, issued on Nov. 7, 1916, discloses a process for marbleizing cement. A coloring compound is prepared including Portland cement and mineral coloring. Then a layer of surface mixture of white Portland cement and water is produced, perhaps one quarter inch thick, and the coloring compound is stirred with paddles into the surface mixture to create streaks resembling marble. This composition is poured into a mold having a polished bottom wall to form a smooth upper slab surface. Then, while this composition is still in a fluid state, it is jarred or vibrated to fill voids and increase surface density. The form is thereafter filled to the top with non-colored backing mix, permitted to harden, removed from the form and inverted.

Wohl, U.S. Pat. No. 2,305,126, issued on Dec. 15, 1942, reveals a process of molding imitation terrazzo tile. In Wohl a mix is once again poured into a form having a polished bottom wall. The bottom wall is waxed and painted, and spotted or grained with the desired arrangement of slab surface coloring. Dry Portland cement is poured into the form and spread uniformly over the polished bottom wall to about one-quarter inch thickness. A damp mix of cement and sand is added. Next the form is placed in a press, such as a hydraulic power press, and pressure is applied to cause the paint to impregnate the hydrated thin layer of cement to a depth sufficient to cause retention of the intended ornamentation on the face of the finished piece. Placement of dry cement over the paint in the form is intended to insure that the paint is attracted to the cement particles prior to hydration.

Jennens, U.S. Pat. No. 1,568,070, issued Jan. 5, 1926, reveals a method of making artificial stone. Coloring matter of the consistency of thick paint is applied to a greased bottom wall of a form. A string or cord is immersed in the coloring matter and distributed over the form bottom wall in a haphazard manner. Then small particles or nodules are sprinkled into the form. A gas forming material, such as bicarbonate of soda, is sifted over the surface. Finally, cementitious material is spread over this deposited composition and a dry material is applied to take up excess moisture. The mix is permitted to cure, and the form is removed and the resulting slab is inverted to an upright position.

Ewen, U.S. Pat. No. 1,596,482, issued on Aug. 17, 1926, teaches a method of producing cement tiles, slabs, and like products. Ewen is much like Spencer, except that there is an additional step of using a grid to separate a colored layer into squares or other shapes. Then alternating shapes are removed and replaced with matching shapes of another color. Denivelle, U.S. Pat. No. 1,233,265, issued on Jul. 10, 1917 is also much like Spencer.

Other references teach coloring an upper surface without need of inverted molding in a form. Phillips, Sr., U.S. Pat. No. 5,441,677, issued Aug. 15, 1995, discloses a method of making high gloss, hardened concrete floors. A non-colored cement mix is poured into a form to within about one-half inch of the full level. Then a dry shake is applied, troweled or otherwise floated, and then another dry shake is applied, and again floated, until the cement in the form reaches a full level. This mix cures into a unified concrete slab having a colored upper layer. A problem with Phillips, Sr. is that the dry shake requires several applications and floatings to create a colored layer. See Phillips column 3, lines 54–66.

Lowe, U.S. Pat. No. 5,320,790, issued on Jun. 14, 1994, discloses a method for producing a durable tactile warning surface. A first method is provided for forming a tactile warning surface on an existing sidewalk, which includes the steps of making a pigmented cement and spreading it over the sidewalk surface and then stamping the wet surface with a patterned tool.

Lowe provides a second method for forming a complete sidewalk slab where none existed before. This second method includes the steps of preparing a cementitious mortar, pouring the cementitious mortar into a form, leveling the mortar to a substantially even thickness of about four inches, applying pigmented hardener to the surface of the mortar to a depth of about one quarter inch to become "an integral part therewith", applying a hydrophobic release agent to the resulting surface, and stamping the surface with a patterned tool. See bottom of Lowe column 4 and top of column 5.

It is thus an object of the present invention to provide a building tile which presents a textured cement surface convincingly simulating brick, stone or ceramic tile, and alternatively presents a textured cement decorative surface.

It is another object of the present invention to provide a building tile which is thin, light weight and flexible.

It is still another object of the present invention to provide such a tile which is formed and textured at the manufacturing plant, so that an ordinary home-owner can simply fit and bond it into place.

It is a further another object of the present invention to provide such a tile which is installed rapidly and with no drying time, and which may be replaced quickly and neatly in selective areas, and which can cover and fully conceal structural cracks.

It is finally an object of the present invention to provide such a tile which is highly durable, will withstand many years of wear and resists denting, is relatively light weight to transport, and is inexpensive to manufacture and thus affordable.

SUMMARY OF THE INVENTION

The present invention accomplishes the above-stated objectives, as well as others, as may be determined by a fair reading and interpretation of the entire specification.

A building tile is provided for covering a building surface, including a flexible backing layer having a rearward face for securing to the building surface and a forward face; and a flexible cement layer secured to the forward face. The tile preferably additionally includes adhesive material, where at least part of the rearward face is covered with the adhesive material for mounting the tile to the building surface. The flexible cement layer is preferably textured to be aesthetically appealing. The flexible cement layer preferably includes a mixture of a cement aggregate; an acrylic resin; a water-based paint; and a waterproof rubber material. The backing layer may be formed of laminate sheet material, peg board or formica sheet material.

A process is also provided of manufacturing a building tile, including the steps of providing a flexible backing layer having a backing layer forward face and a backing layer rearward face; abrading the backing layer forward face; mixing an aggregate cement with an acrylic resin until a false set is reached; mixing into the aggregate cement and acrylic resin mixture a waterproof rubber material and paint; and spreading the mixture over the backing layer forward face. The process preferably includes the additional steps of adding adhesive as needed to reach a mixture consistency suitable for spreading, coloring the mixture or coloring when dry, texturing the mixture, and sealing the mixture using with a surface sealer. The surface sealer may include xylene or may be water based. The mixture may be colored by using pre-colored cement, or by applying water base paint to form a solid color and mixing into white cement, or by applying water-based cement paint to form a solid color. The process may include the additional steps of adding a water-based sealer to the mixture prior to curing of the mixture.

A building tile is also provided for covering a building surface, including a flexible backing layer having a rearward face for securing to the building surface and a forward face; and a flexible grout layer secured to the forward face.

BRIEF DESCRIPTION OF THE DRAWINGS

Various other objects, advantages, and features of the invention will become apparent to those skilled in the art from the following discussion taken in conjunction with the following drawings, in which:

FIG. 1 is a perspective, exploded view of one tile showing the flexible cement layer, the backing layer and the adhesive covering sheet, the tile being positioned above a building surface.

FIG. 2 is a perspective view of one tile showing the display face being textured with a hand trowel.

DETAILED DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Referring to FIGS. 1–2, a tile 10 is disclosed for covering building surfaces such as floors, walls and counter tops. Tile 10 includes a flexible and resilient backing layer 12 having a rearward face 14 for securing to a building surface 16 such as a floor and a forward face 18 covered with a flexible cement layer 20. Rearward face 14 is preferably covered with a mounting adhesive 22 and a peal off adhesive covering plastic or paper sheet 24. Tile 10 may alternatively be screwed or glued down, or attached to building surface 16 in any of the numerous other ways known in the art. Flexible cement layer 20 has a display face 26 which is preferably textured to have aesthetically appealing surface irregularities 28. Layer 20 is preferably colored and shaded with any of a wide variety of pigments. The resulting appearance, feel and durability substantially duplicate those of far more expensive poured cement URO-TILE™ style surfaces.

Backing layer 12 is preferably a conveniently sized square of laminate, peg board, formica, wood or other suitable sheet material. Many inter-fitting backing layer 12 shapes other than squares are contemplated. Flexible cement layer 20 is preferably formed of a fine aggregate cement mixture mixed with an acrylic resin, a water-based paint and waterproof rubber material. A water-based sealer is preferably added to the mixture. Fiberglass strands are optionally added prior to curing to increase tile 10 strength. After curing, a surface sealer is preferably added, which may be either a xylene or water based sealer. A flexible grout layer may in some instances replace the flexible cement layer 20, and is considered equivalent for purposes of this application. The grout layer version of tile 10 is intended primarily to be produced in long, narrow strips for placement between the flexible cement layer tiles 10.

Process

In practicing the invention, the following method may be used. A process of manufacturing the tile 10 includes the steps of sanding or grinding the forward face 18 of a backing layer 12 to develop grooves and to de-gloss the face 18; mixing a fine aggregate cement with an acrylic resin and waiting until a false set is reached; mixing into the fine aggregate cement and acrylic resin mixture 30 a waterproof rubber material and a water-based sealer and water base paint; adding adhesive as needed to reach a suitable consistency; spreading the mixture 30 over the forward face 18 of backing layer 12; coloring the mixture 30; texturing the mixture 30 with a trowel 32 or machine trowel while the mixture 30 is wet or semi-wet, or when dry with a machine trowel or die or impression plate; permitting the mixture 30 to dry completely to form flexible cement layer 20; sealing the dry mixture 30 using with a suitable surface sealer such as a xylene or water-based sealing coat. See FIG. 2. If xylene-based surface sealer is used, one quart of boiled linseed oil may be added to a quantity of one to five gallons of the xylene-based sealer to create a shiny top coat.

Mixture 30 can be colored in any of several ways. These include using pre-colored cement; using pre-colored cement mixed with white cement; using xylene or water-based cement stain or paint to form a solid color and mixing the stain or paint into white or colored cement; or after mixture 30 is dry, applying by hand or by machine a powdered pigmented cement color to the display face 26.

Many dimensions and shapes are contemplated for tile 10. Backing layer 12 and flexible layer 20 may each have any of numerous different thicknesses, yet prototype testing has shown that an optimum combination of tile 10 flexibility and durability are achieved when they are each in the range of one sixteenth to one quarter inches thick.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A building tile for covering a building surface, comprising a flexible backing layer having a rearward face for securing to said building surface and a forward face; and a flexible cement layer secured to said forward face, wherein said flexible cement layer comprises a mixture of:

a cement aggregate;

an acrylic resin;

a water-based paint;

and a waterproof rubber material.

2. The tile of claim 1, additionally comprising adhesive material, wherein at least part of said rearward face is covered with said adhesive material for mounting said tile to said building surface.

3. The tile of claim 1, wherein said backing layer is formed of laminate sheet material.

4. The tile of claim 1, wherein said backing layer is formed of formica sheet material.

5. A building tile for covering a building surface, comprising a flexible backing layer having a rearward face for securing to said building surface and a forward face; and a flexible cement layer secured to said forward face, wherein said flexible cement layer comprises a mixture of:

cement;

and an acrylic resin.

6. The tile of claim 5, additionally comprising:

a water-based paint.

7. The tile of claim 5, additionally comprising:

a waterproof rubber material.

8. The tile of claim 5, wherein said backing layer is formed of laminate sheet material.

9. The tile of claim 5, wherein said backing layer is formed of formica sheet material.

\* \* \* \* \*